May 6, 1930.  J. L. BREWTON  1,757,512
HARROW
Filed Nov. 30, 1927  2 Sheets-Sheet 1
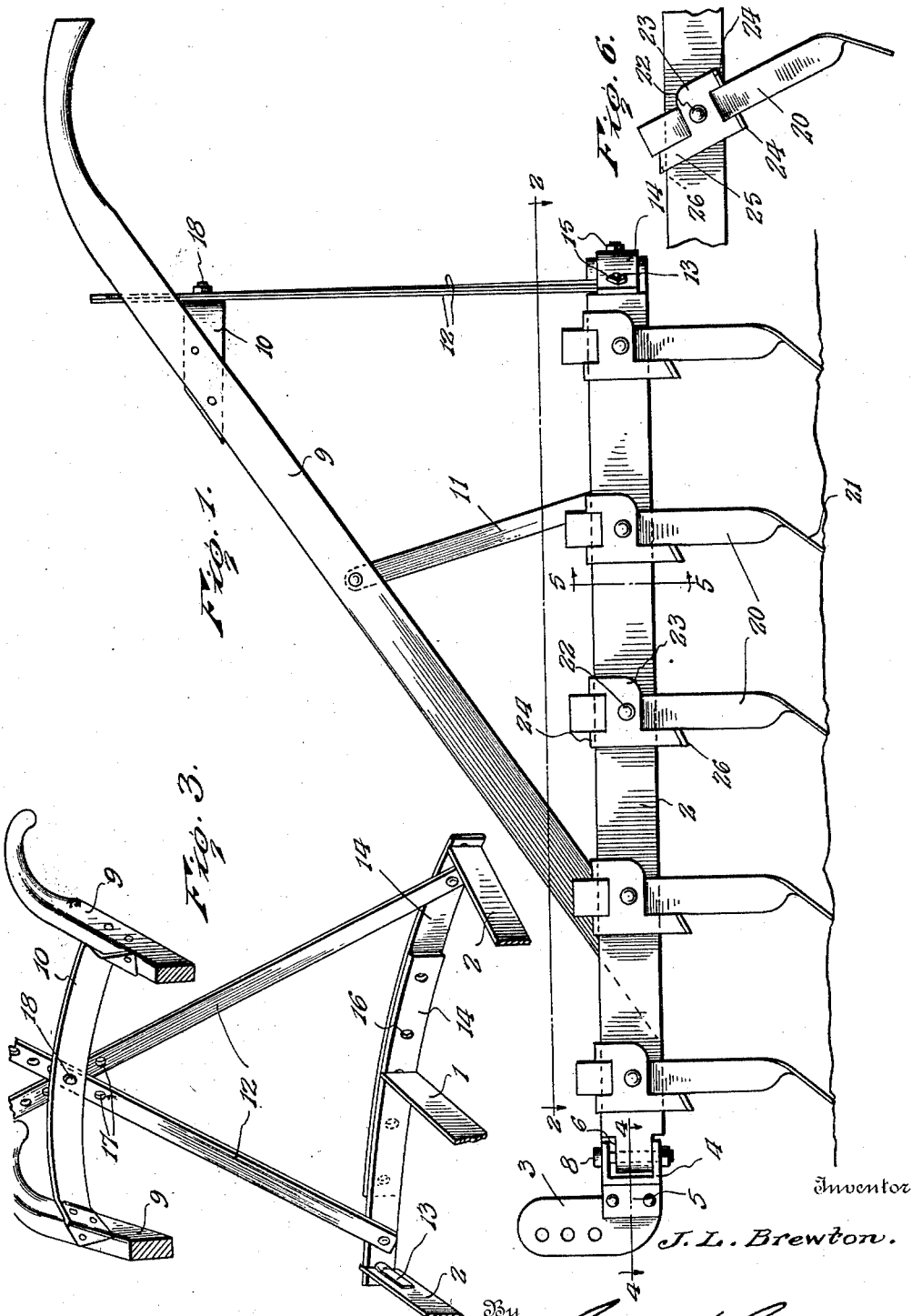
Inventor
J. L. Brewton.
By Lacey & Lacey, Attorneys

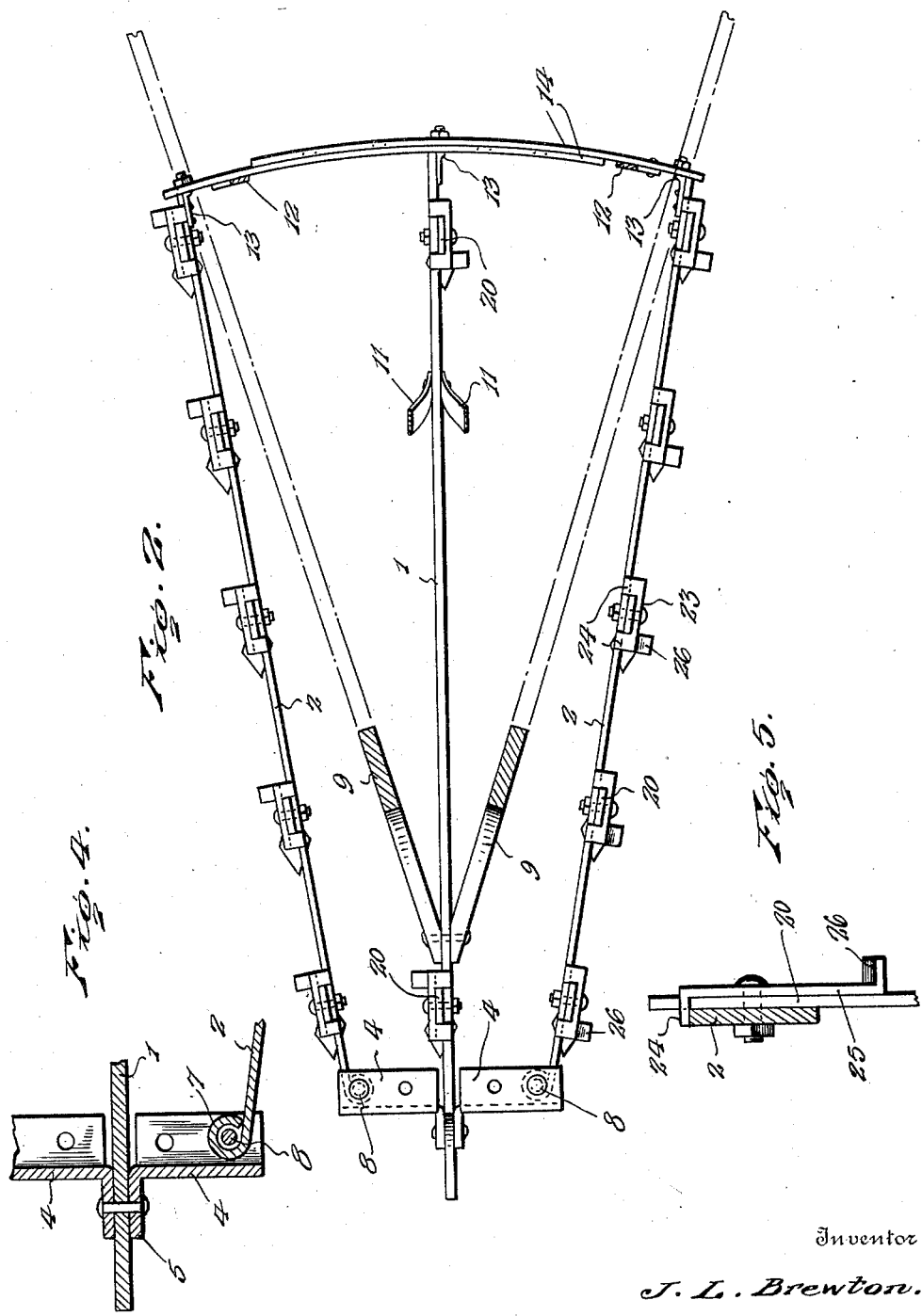

Patented May 6, 1930

1,757,512

UNITED STATES PATENT OFFICE

JOSEPH L. BREWTON, OF RUSTON, LOUISIANA

HARROW

Application filed November 30, 1927. Serial No. 236,808.

This invention relates to harrows and has for its object the provision of a harrow in which a pair of beams or tooth-carrying bars may be adjusted to cause the teeth to operate over a wider or narrower path as may be desired. Another object of the invention is to provide a simple construction whereby the beams may be effectually held in a set position. These stated objects, and other objects which will incidentally appear in the course of the following description, are attained in such a device as is illustrated in the accompanying drawings, and the invention resides in certain novel features which will be particularly pointed out in the claim.

In the drawings:

Figure 1 is a side elevation of a harrow embodying my invention;

Fig. 2 is a view, partly in plan and partly in horizontal section, on the line 2—2 of Fig. 1;

Fig. 3 is a detail perspective view showing the connections between the rear ends of the harrow beams;

Fig. 4 is a detail horizontal section on the line 4—4 of Fig. 1;

Fig. 5 is an enlarged detail section on the line 5—5 of Fig. 1; and

Fig. 6 is a detail showing the harrow tooth set in a position differing from that shown in Fig. 1.

The harrow embodying my invention includes a central beam 1 and side beams 2, the central beam having its front end upturned, as shown at 3, and provided with a vertical series of openings whereby a clevis or other draft device may be attached thereto at a desired height. Secured to the sides of the central beam at or near the front end thereof are laterally extending heads or brackets 4 which are in the form of channel bars having their central webs extended and bent forward, as shown at 5, whereby they may be attached to the beam. The side bars 2 have their forward extremities reduced, as shown at 6, and formed into eyes 7 which loosely encircle retaining bolts 8 inserted through the webs or flanges of the brackets 4 whereby the side beams may be adjusted laterally about the bolts as pivots and may be also rocked vertically to an extent permitted by the upper and lower webs or flanges of the respective brackets. It will also be noted that the heads or brackets 4 are provided with a plurality of bolt holes to accommodate the bolts 8 so that the front ends of the side beams may be set at a selected distance apart. Handles 9 of well-known form are secured at their front ends to the central beam adjacent the front end thereof and extend upwardly and rearwardly therefrom, being connected by a connecting bar or brace 10 adjacent their upper ends and being also reinforced and supported by bracing posts 11 secured at their lower ends to the central beam near the rear end thereof and at their upper ends to the respective handles, as will be understood. The bracing bar or bracket 10 is so formed as to project somewhat to the rear of the handles, as shown in Fig. 1, and hangers 12 are adjustably attached thereto, as shown and as will be presently more particularly described. The rear ends of all the beams are provided with threaded studs or bolts 13 which project rearwardly and extend through the connecting straps or bars 14 which straps or bars are slightly arcuate and are secured to the several studs by nuts, indicated at 15, mounted on the studs and turned home against the straps. The straps are of such length that their intermediate portions overlap, as clearly shown in Figs. 2 and 3, and they are provided with longitudinal series of openings 16 adapted to be selectively engaged over the stud 13 on the central beam whereby the straps may be spread or retracted as may be desired and, consequently, caused to set the side beams at greater or less distances from the central beam. The hangers 12 are pivoted at their lower ends to the outer end portions of the connecting straps 14 and in their upper portions are formed with longitudinal series of openings 17 to be selectively engaged over a stud 18 projecting from the bracket 10 at the center of the same. By engaging the proper openings with the stud, the hangers may be set to accommodate the adjustment of the connecting straps 14 and may also be so adjusted as to set the rear ends of the outer beams at a greater or less height. This construction and arrangement of parts permits me to set the side beams so that the teeth carried thereby may operate over a wider or narrower path and also may be set to progressively enter the ground to greater depths so that the harrow may be easily adjusted to operate most efficiently according to soil conditions.

The central beam 1 is equipped with a harrow tooth 20 adjacent its front end and with a second tooth 20 adjacent its rear end while the side beams carry a plurality of like teeth 20, as shown. The teeth employed by me have flat shanks with their lower ends twisted to form spear heads 21 adapted to enter and scratch the ground in an obvious manner, and when at work the several harrow teeth may be set vertically, as shown clearly in Fig. 1, whereby their working ends will be disposed forwardly in proper position to reduce the soil to a fine mulch. Through the upper end portion of each tooth and the adjacent beam, a securing bolt 22 is inserted and a bracket 23 is disposed about the shank of the tooth and secured in place by the same bolt. The bracket extends both forwardly and rearwardly of the attaching bolt and on its upper edge at its front and rear corners is constructed with overhanging lips 24 which rest upon the upper edge of the beam and extend across the front and rear edges of the tooth shank, the tooth being thus held firmly to its work. Depending from the lower edge of the bracket at the front end thereof is an elongated tongue 25 which has its lower extremity turned outwardly and then upwardly, as shown at 26, so as to form an obliquely disposed seat. When it is desired to have the harrow tooth scratch the soil without any turning action, the bracket is inverted so that the seat 26 will engage over the edge of the beam in front of the tooth shank, as shown in Fig. 6, thereby holding the shank in an inclined position with its point perpendicular or nearly so. No claim is made herein to the means for mounting the tooth as the same forms the subject-matter of a divisional application filed October 12, 1928, Serial No. 312,151.

The harrow may be drawn over the ground by a tractor or by draft animals and is guided by an attendant walking behind the same and it is obviously of a light construction which is at the same time strong and well calculated to resist the strains to which it is subjected in use. The adjustment of the side beams may be accomplished in a few minutes and, when these beams have been set in the desired position, they will be firmly held in that position.

Having thus described the invention, I claim:

A harrow comprising a central beam, laterally extending channeled brackets having their central webs extended forwardly and rigidly secured to said beam adjacent the front end thereof, side beams having their front ends reduced and formed into vertically extending eyes disposed between the upper and lower flanges of the respective brackets, bolts inserted through the flanges of the brackets and passing loosely through said eyes to pivotally secure the beams and permit a limited vertical rocking movement thereof, handles carried by the central beam, overlapping straps attached to the rear ends of the outer beams and adjustably attached to the rear end of the central beam, and hangers adjustably connected at their upper ends with the handles and having their lower ends pivoted to the overlapping straps adjacent the side beams.

In testimony whereof I affix my signature.

JOSEPH L. BREWTON. [L. S.]